United States Patent [19]
Smith et al.

[11] 3,897,331
[45] July 29, 1975

[54] MERCURY RECOVERY

[75] Inventors: Bruce T. Smith; Roger S. Pacheco, both of Brunswick, Ga.

[73] Assignee: Allied Chemical Corporation, New York, N.Y.

[22] Filed: Oct. 10, 1974

[21] Appl. No.: 513,691

[52] U.S. Cl. .................. 209/10; 209/173; 209/422; 210/75; 210/40
[51] Int. Cl. ............................................. B03b 3/00
[58] Field of Search ......... 209/10, 172, 2, 173, 422, 209/461–464, 43, 208, 209; 210/75, 93, 39, 40; 75/101 R, 121; 423/102

[56] References Cited
UNITED STATES PATENTS

| | | | |
|---|---|---|---|
| 2,965,522 | 12/1960 | Crespin et al. | 209/211 |
| 2,966,431 | 12/1960 | Lorenz et al. | 209/2 X |
| 3,392,835 | 7/1968 | Asper | 209/211 UX |
| 3,476,552 | 11/1969 | Parks et al. | 75/121 X |
| 3,674,146 | 7/1972 | Hoegger | 210/75 X |
| 3,679,052 | 7/1972 | Asper | 210/75 |
| 3,695,838 | 10/1972 | Knepper et al. | 75/121 |
| 3,736,253 | 5/1973 | De Angelis et al. | 210/40 X |

*Primary Examiner*—Frank W. Lutter
*Assistant Examiner*—Ralph J. Hill
*Attorney, Agent, or Firm*—Gerhard H. Fuchs; Gerard P. Rooney

[57] ABSTRACT

In the method for recovering mercury from carbonaceous filter aid used in filtration of mercury cell alkali metal hydroxide solution to remove mercury therefrom, the steps which comprise: slurrying the filter aid in a liquid medium, allowing the slurried filter aid to settle to form a mercury-rich filter aid slurry stratum and a supernatant mercury-lean filter aid slurry stratum, and separately recovering the mercury-rich stratum.

8 Claims, 1 Drawing Figure

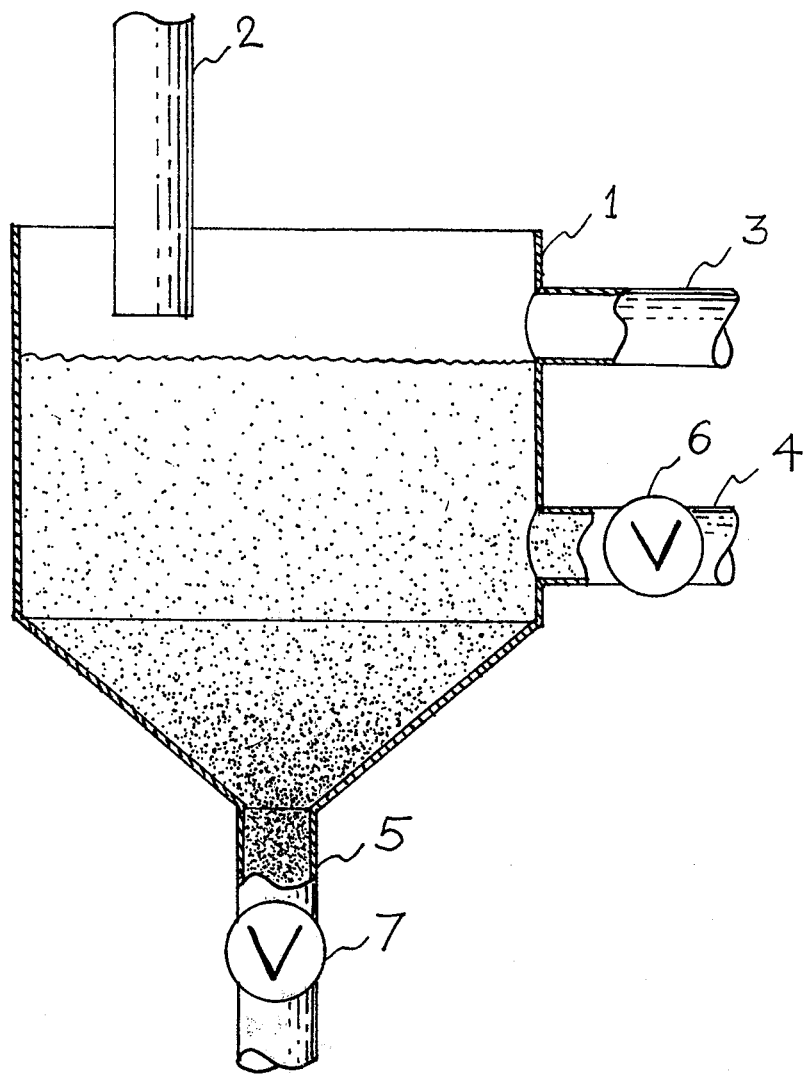

MERCURY RECOVERY

BACKGROUND OF THE INVENTION

Chlorine and alkali metal hydroxides are almost entirely produced by electrolysis of alkali metal chloride brines. Chlorine and hydrogen are obtained as the gaseous products as the brine is converted to alkali metal hydroxide solution. Two types of cell design are conventionally used for that process, diaphragm cells and mercury cells. In diaphragm cells, anode and cathode are separated by an asbestos diaphragm to allow separate recovery of the chlorine and hydrogen. In mercury cells, the brine is continually fed and partly decomposed in a first compartment between a graphite anode and a flowing mercury cathode, forming chlorine gas at the anode and an alkali metal amalgam at the cathode. The amalgam flows to a second compartment, the "denuder," where it becomes the anode to a short-circuited iron or graphite cathode in an alkali metal hydroxide solution. Purified water is fed to the denuder and the alkali metal component of the amalgam reacts with water to form hydrogen gas and alkali metal hydroxide, which is recovered at high purity in aqueous solution at 30 to 70 percent concentration.

Small amounts of mercury in particulate form are carried along with the product from the denuder and must be separated therefrom by filtration. This is usually accomplished by filtering the alkali metal hydroxide product as obtained from the denuder through a filter coated which carbonaceous filter aid, such as activated carbon. The metallic mercury is retained in the carbonaceous filter aid and a high purity alkali metal hydroxide product is obtained substantially free of mercury.

As filtration proceeds, mercury builds up in the filter aid and is recovered therefrom on periodic basis. To that end, filter cake comprising carbonaceous filter aid containing mercury is stripped from the filter and is fed to apparatus for recovery of mercury, usually the retort of a distillation apparatus wherein mercury metal is recovered by distillation in the overhead product. The distillation residue remaining in the retort comprising carbonaceous filter aid is not suitable for further use and is discarded.

We have now surprisingly found that the mercury particles retained by the filter are not uniformly distributed among the filter aid particles, and that it is possible to subject the filter aid to treatment permitting separate recovery of filter aid particles rich in mercury eminently suited for use in the mercury recovery operation, and filter aid particles lean in mercury which are suitable for reuse in the filtration operation. This has the two-fold advantage of providing feed to the mercury recovery apparatus containing mercury in more concentrated form, thereby facilitating mercury recovery, and of permitting reuse of mercury-lean carbonaceous filter aid, thereby reducing filter aid consumption.

SUMMARY OF THE INVENTION

The present invention provides a method for separating mercury-containing carbonaceous filter aid used in filtration of mercury cell alkali metal hydroxide solution into a mercury-rich portion and a mercury-lean portion. In accordance with the present invention there are provided, in the method for recovering mercury from carbonaceous filter aid used in filtration of mercury cell alkali metal hydroxide solution to remove mercury therefrom, the steps which comprise: (a) slurrying the filter aid in a liquid medium, (b) allowing the slurried filter aid to settle to form a mercury-rich filter aid slurry stratum and a supernatant mercury-lean filter aid slurry stratum, and (c) separately recovering the mercury-rich stratum.

DETAILED DESCRIPTION OF THE INVENTION AND OF THE PREFERRED EMBODIMENTS

The accompanying drawing is a flow diagram of a preferred embodiment in apparatus for carrying out the process of the present invention.

In conventional operation for mercury removal from mercury cell alkali metal hydroxide solution, a filter, usually a precoat pressure filter of conventional leaf design, is precoated with carbonaceous filter aid in a layer of sufficient depth to insure removal of mercury to acceptable level. The alkali metal hydroxide is then passed through the filter, and samples are taken on periodic basis for determination of mercury contamination in the filter effluent. As the precoat of carbonaceous filter aid becomes saturated with mercury metal, the mercury contamination in the product rises to unacceptable levels and the precoat must be replaced. This is usually accomplished by "backwashing" the filter, usually with alkali metal hydroxide solution, followed by renewed precoating. The carbonaceous filter aid removed in the backwashing operation is obtained as a slurry in the "backwash." It is allowed to settle, the clear supernatant alkali metal hydroxide solution is decanted and the filter aid sediment still containing appreciable amounts of alkali metal hydroxide is fed to the retort.

We have now surprisingly discovered that complete settlement of the filter aid in the backwash is neither necessary nor desirable. Rather, we have found that settlement of the mercury-laden filter aid in the backwash results in formation of a mercury-rich filter aid slurry stratum at the lower portion of the vessel wherein sedimentation occurs, and a supernatant mercury-lean filter aid slurry stratum. We have further found that the filter aid from the mercury-lean slurry stratum is suitable for reuse in the filtration operation. The mercury-rich lower stratum contains most of the mercury and is suitable for feed to the mercury recovery operation, preferably after further drying. It should be appreciated that upon settlement the mercury concentration of the filter aid in the liquid medium will be highest in the bottom portion and lowest in the top portion, gradually increasing from the bottom portion toward the top portion, so that the intermediate portions contain intermediate amounts of mercury, there being no sharp dividing line between these strata. Thus, the term "Stratum," when referring to mercury-rich and mercury-lean filter aid slurry strata, is used with reference to an arbitrary dividing line, which is chosen on the basis of considerations such as permissible maximum mercury content of the filter aid from the mercury-lean stratum which is to be re-used, and desired mercury concentration in the retort feed.

Any liquid medium is suitable for use in the process steps of the present invention, provided its gravity is not so high as to prevent settlement of the mercury-laden filter aid particles, and provided further it is unreactive with the mercury contained in the filter aid. Suitable liquid media include aqueous solutions of the alkali metal hydroxide of any concentration, provided specific gravity is low enough to permit settlement of the filter aid, we well as aqueous media. In preferred operation, the backwashing operation is carried out using water and the water serves as the settlement medium for the filter aid. The temperature and pressure at which the settling operation is permitted to proceed are not critical.

Settlement of the filter aid in accordance with the process steps of the present invention may rely on gravity, e.g., by sedimentation or elutriation, or may be induced by centrifugal force, or a combination thereof. It may be carried out in any suitable apparatus, but is conveniently conducted in a decanter provided with a bottom portion of the shape of an inverted cone with a bottom outlet at the apex thereof.

In usual practice of the invention process, the filter backwash containing mercury-laden carbonaceous filter aid is charged to a decanter vessel having a bottom outlet, wherein it may be agitated, if desired, to insure formation of homogeneous filter aid slurry. The slurry is then allowed to stand to permit the carbonaceous filter aid particles pregnant with mercury to settle to the lower levels within the slurry, forming a stratum rich in mercury-laden carbonaceous filter aid, and a supernatant stratum correspondingly rich in mercury-lean carbonaceous filter aid. Once sedimentation has proceeded to desired level, usually within a time period of 2 to 14 hours, more preferably 8 to 12 hours, the mercury-rich filter aid slurry stratum is withdrawn through the bottom outlet of the decanter.

The time required for settlement by force of gravity will usually depend on factors such as depth of the slurry in the decanter, particle size of the filter aid, solids concentration in the slurry, and specific gravity and viscosity of the liquid medium, and can readily be determined for each set of conditions by simply experimentation. If desired, the mercury-rich filter aid contained in the separated mercury-rich filter aid slurry stratum may be separated from the liquid phase by simply filtration, as, e.g., by straining it through a suitable filter membrane to separate liquids from solids. Solids remaining on the filter membrane may then be charged to the mercury recovery operation, usually the retort of a mercury recovery distillation apparatus.

The mercury-lean filter aid slurry stratum can be used in the precoating operation for the filter, thus permitting reuse of the mercury-lean filter aid. It is advantageous to use this mercury-lean filter aid to provide the top layer of the filter precoat. Thus, in preferred operation the filter is first precoated using virgin carbonaceous filter aid, followed by passing the mercury-lean filter aid slurry through the precoated filter. By operating in this manner, there is provided on the filter a first coat of mercury-free filter aid, topped by a second coat of filter aid which already contains some mercury. As mercury containing alkali metal hydroxixe is passed through the filter so coated, the second coat of filter aid is first exposed to the mercury contained in the solution to be filtered, as a result of which this second coat is selectively enriched in mercury, facilitating selective sedimentation of the filter aid in the sedimentation step of the method of the present invention.

The following more detailed description illustrates a preferred embodiment and sets forth the best mode presently contemplated for practice of the present invention.

With reference to the drawing, apparatus employed is a decanter vessel 1 equipped with over-flow 3, side outlet 4, bottom outlet 5 and slurry feedline 2. Side outlet 4 and bottom outlet 5 respectively are equipped with valves 6 and 7. Backwash slurry of carbonaceous filter aid obtained by backwashing with water a pressure precoat leaf filter which is used for filtering mercury cell sodium hydroxide to remove mercury contamination therefrom is fed to decanter 1 through slurry feedline 2 to the level of overflow 3. The slurry contains about 20 g./liter of carbonaceous filter aid, based on the weight of the aqueous medium. Slurry feed is then discontinued and the slurry in decanter vessel 1 is allowed to settle for a period of 2 to 14 hours. During this period, slurried carbonaceous filter aid settles to form a mercury-rich filter aid slurry stratum in the lower portion of the decanter vessel, and a supernatant mercury-lean filter aid slurry stratum in the upper portion of the decanter vessel. The mercury-lean filter aid slurry stratum is then withdrawn through side outlet 4 by opening valve 6. After withdrawal of the supernatant mercury-lean filter aid slurry stratum, the mercury-rich filter aid slurry stratum is withdrawn through outlet 5 by opening valve 7. The mercury-rich filter aid slurry so withdrawn is drained through a Dynel filter bag to separate liquids from solids. The filter aid pregnant with mercury retained in the Dynel filter bag is charged to the retort of a mercury recovery still. The carbonaceous filter aid in the feed slurry contains about 100,000 to 500,000 ppm of mercury by weight, basis the dry filter aid. The mercury-lean filter aid withdrawn through side outlet 4 contains about 1,000 to 10,000 ppm of mercury, basis the dry filter aid. The mercury-rich filter aid withdrawn through bottom outlet 5 contains in excess of about 100,000 ppm of mercury, basis the dry filter aid, usually together with some free metallic mercury.

While in the above description settlement is allowed to proceed by action of gravity alone, settlement into a mercury-rich filter aid slurry stratum and a mercury-lean filter aid slurry stratum may also be accomplished by subjecting the slurry to centrifugal force, as may be accomplished by passing it through a suitable centrifuge of conventionala design, and separately recovering a mercury-rich filter aid slurry stratum and a mercury-lean filter aid slurry stratum.

The process steps of the present invention may be carried out on carbonaceous filter aid slurrys of wide ranging concentration. Filter aid slurrys may contain as little as 5 g./liter of carbonaceous filter aid, and may be as concentrated as conventional 100 g./liter of carbonaceous filter aid. Preferred slurries contain between about 10 and about 50, more preferably, between about 20 and about 40 grams of carbonaceous filter aid per liter.

The present invention may be embodied in other forms or may be carried out in other ways without departing from the spirit or essential characteristics thereof. The present embodiments are therefore to be considered in all respects as illustrative only, the scope of the invention being solely limited by the appendent claims.

We claim:

1. In the method for recovering mercury from carbonaceous filter aid used in filtration of mercury cell alkali metal hydroxide solution to remove mercury therefrom, the steps which comprise:

a. slurrying the filter aid in a liquid medium;
b. allowing the slurried filter aid to settle to form a mercury-rich filter aid slurry stratum and a supernatant mercury-lean filter aid slurry stratum; and
c. separately recovering the mercury-rich stratum.

2. The method of claim 1 wherein the filter aid is slurried in an aqueous medium.

3. The method of claim 2 wherein the filter aid is slurried in an aqueous medium to obtain a filter aid slurry containing about 5 to 100 g./liter of filter aid.

4. The method of claim 2 wherein the filter aid is slurried in an aqueous medium to obtain a filter aid slurry containing about 10 to 50 g./liter of filter aid.

5. The method of claim 2 wherein the filter aid is slurried in water to obtain a filter aid slurry containing about 10 to 50 g./liter of filter aid.

6. The method of claim 1 wherein the step of slurrying the filter aid in a liquid medium comprises backwashing the filter used in filtration of the mercury cell alkali metal hydroxide solution with water to obtain a filter aid slurry containing about 5 to 100 g./liter of filter aid.

7. The method of claim 1 wherein the step of slurrying the filter aid in a liquid medium comprises backwashing the filter used in filtration of the mercury cell alkali metal hydroxide solution with water to obtain a filter aid slurry containing about 10 to 50 g./liter of filter aid.

8. The method of claim 7 wherein additionally the separately recovered mercury-rich stratum is subjected to filtration to separate aqueous and solid phases.

* * * * *